United States Patent
Jou et al.

(10) Patent No.: US 10,860,711 B2
(45) Date of Patent: Dec. 8, 2020

(54) METHOD AND SYSTEM FOR ANALYZING RISK

(71) Applicant: Interset Software, Inc., Santa Clara, CA (US)

(72) Inventors: Stephan F. Jou, Richmond Hill (CA); Shaun Pilkington, Los Angeles, CA (US)

(73) Assignee: Interset Software Inc., Santa Clara, CA (US)

( * ) Notice: Subject to any disclaimer, the term of this patent is extended or adjusted under 35 U.S.C. 154(b) by 113 days.

(21) Appl. No.: 15/786,214

(22) Filed: Oct. 17, 2017

(65) Prior Publication Data
US 2018/0052993 A1    Feb. 22, 2018

Related U.S. Application Data

(62) Division of application No. 14/579,421, filed on Dec. 22, 2014, now Pat. No. 9,830,450.

(60) Provisional application No. 61/919,991, filed on Dec. 23, 2013.

(51) Int. Cl.
  *G06F 21/55* (2013.01)
  *G06F 21/31* (2013.01)
  *G06F 21/57* (2013.01)
(52) U.S. Cl.
  CPC .......... *G06F 21/552* (2013.01); *G06F 21/316* (2013.01); *G06F 21/577* (2013.01)

(58) Field of Classification Search
  CPC .. G06F 21/316; G06F 21/552; G06Q 20/4016
  See application file for complete search history.

(56) References Cited

U.S. PATENT DOCUMENTS

| | | | |
|---|---|---|---|
| 8,516,597 B1 * | 8/2013 | Sharma | G06F 21/577 705/38 |
| 8,776,168 B1 | 7/2014 | Gibson et al. | |
| 9,032,514 B1 * | 5/2015 | Sankararaman | H04L 63/1425 726/22 |
| 9,830,450 B2 | 11/2017 | Jou et al. | |

(Continued)

OTHER PUBLICATIONS

Official Action for U.S. Appl. No. 14/579,421, dated Jan. 20, 2016 6 pages Restriction Requirement.

(Continued)

*Primary Examiner* — David J Pearson (57) ABSTRACT

The present invention provides a method, system and computer program product for analyzing risks, for example associated with potential data leakage. Risk for activities may be measured as a function of risk components related to: persons involved in the activity; sensitivity of data at risk; endpoint receiving data at risk; and type the activity. Risk may account for the probability of a leakage event given an activity as well as a risk cost which reflects the above risk components. Manually and/or automatically tuned parameters may be used to affect the risk calculation. Risk associated with persons and/or files may be obtained by: initializing risk scores of persons or files based on a rule set; adjusting the risk scores in response to ongoing monitoring of events; identifying commonalities across persons or files; and propagating risk scores based on the commonalities.

20 Claims, 5 Drawing Sheets

(56) References Cited

U.S. PATENT DOCUMENTS

| | | | |
|---|---|---|---|
| 2005/0193250 A1* | 9/2005 | Takeuchi | G06F 21/552 714/15 |
| 2008/0189788 A1* | 8/2008 | Bahl | G06F 21/577 726/25 |
| 2009/0126012 A1 | 5/2009 | Treadwell et al. | |
| 2010/0125911 A1* | 5/2010 | Bhaskaran | G06Q 10/10 726/23 |
| 2012/0023567 A1* | 1/2012 | Hammad | G06Q 20/12 726/9 |
| 2012/0047575 A1 | 2/2012 | Baikalov et al. | |
| 2012/0159647 A1 | 6/2012 | Sanin et al. | |
| 2012/0210388 A1* | 8/2012 | Kolishchak | G06F 21/552 726/1 |
| 2013/0097659 A1 | 4/2013 | Das et al. | |
| 2013/0097709 A1 | 4/2013 | Basavapatna et al. | |
| 2014/0046863 A1* | 2/2014 | Gifford | G06Q 50/265 705/325 |
| 2014/0089189 A1* | 3/2014 | Vasireddy | G06Q 20/4016 705/44 |
| 2014/0359777 A1 | 12/2014 | Lam et al. | |
| 2015/0100940 A1 | 4/2015 | Mockus et al. | |
| 2015/0170148 A1* | 6/2015 | Priebatsch | G06Q 20/4016 705/44 |

OTHER PUBLICATIONS

Official Action for U.S. Appl. No. 14/579,421, dated Apr. 20, 2016 13 pages.

Official Action for U.S. Appl. No. 14/579,421, dated Sep. 16, 2016 13 pages.

Official Action for U.S. Appl. No. 14/579,421, dated Jan. 11, 2017 12 pages.

Notice of Allowance for U.S. Appl. No. 14/579,421, dated Jul. 18, 2017 12 pages.

* cited by examiner

METHOD AND SYSTEM FOR ANALYZING RISK

CROSS-REFERENCE TO RELATED APPLICATIONS

This application is a divisional application of U.S. application Ser. No. 14/579,421 filed Dec. 22, 2014, now pending; which claims the benefit under 35 USC § 119(e) to U.S. Application Ser. No. 61/919,991 filed Dec. 23, 2013. The disclosure of each of the prior applications is considered part of and is incorporated by reference in the disclosure of this application.

BACKGROUND OF THE INVENTION

Field of the Invention

The present invention pertains in general to behavioural risk analysis and in particular to a method and system for analyzing risk, such as risk associated with potential data loss or data leakage, for example of sensitive digital files.

Background Information

Data leakage is a significant concern for organizations and can result in loss of intellectual property, loss of competitive advantage, social or political repercussions, and the like. Data leakage can stem from various sources, such as rogue behaviours of trusted individuals, unauthorized access of data by a person either inside or outside the organization, or accidental leakage. Data leakage may relate to a data breach, security breach, data loss, data theft, hacking event, unintentional information disclosure, or the like. One definition states that a data breach may correspond to a security incident in which sensitive, protected or confidential data is copied, transmitted, viewed, stolen or used by an individual unauthorized to do so.

Various approaches to guarding against and mitigating data leakage events involve establishing a secure data environment in which only trusted individuals are able to access sensitive data. However, some individuals are accorded more trust than they merit. In addition, outsiders may still on occasion exploit security flaws to access the secure data environment, often using the credentials of trusted individuals. As organizations grow in size and complexity, it becomes more difficult to monitor interactions with a secure data environment in order to maintain security. Furthermore, even if data leakage events are reliably detected as they occur, they may not necessarily be preventable. It is more desirable to predict data leakage events before they occur, so that preventive measures can be taken.

Therefore there is a need for a method and system for analyzing risks associated with potential data leakage that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide methods, systems and computer program products for analyzing risks, such as but not necessarily limited to risks associated with potential data leakage. In accordance with an aspect of the present invention, there is provided a method for measuring risk associated with a behavioural activity, the method comprising: determining a first risk component associated with one or more persons involved in performing the activity; determining a second risk component associated with sensitivity of one or more assets comprising data associated with the risk; determining a third risk component associated with an endpoint which receives said one or more assets due to the activity; determining a fourth risk component associated with a type of the activity; and measuring the risk as a function of at least one of the first risk component, the second risk component, the third risk component, and the fourth risk component.

In accordance with another aspect of the present invention, there is provided a method for measuring risk, such as but not necessarily limited to data leakage risk, associated with a behavioural activity, the method comprising: obtaining one or more probabilities, each probability associated with a respective potential undesired event and each probability being a conditional probability given the observed activity; optionally adjusting each of said probabilities by multiplication with a respective probability weighting factor; for each potential undesired event, obtaining one or more entity costs, each entity cost representative of a contribution to said risk associated with a given type of entity associated with the activity; for each potential undesired event, determining a resultant cost as a function of said entity costs; and measuring the risk as an expectation over the one or more resultant costs distributed over the associated probabilities of potential undesired events.

In accordance with another aspect of the present invention, there is provided a method for measuring risk associated with data files within a population, the method comprising: initializing risk scores of the data files based on a rule set; adjusting the risk scores in response to ongoing interaction with the data files; identifying commonalities across data files; and at least partially propagating risk scores between data files based on said identified commonalities.

In accordance with another aspect of the present invention, there is provided a method for measuring risk associated with persons within a population, the method comprising: initializing risk scores of said persons based on a rule set; adjusting the risk scores in response to ongoing monitoring of events associated with activities of said persons; identifying commonalities across said persons within the population; and at least partially propagating risk scores between said persons based on said identified commonalities.

BRIEF DESCRIPTION OF THE DRAWINGS

These and other features of the invention will become more apparent in the following detailed description in which reference is made to the appended drawings.

DETAILED DESCRIPTION OF THE INVENTION

Definitions

The term "behaviour" refers to an observable activity or pattern of activities performed by an entity such as an individual, a machine system such as a computer system, or a combination of such entities.

The term "data leakage" refers to an event in which a given set of data is accessed or made accessible by an unauthorized entity, or used in an unauthorized manner. The data may be but is not limited to digital data stored in a computer system.

The term "risk" refers to a measurement or estimate of impact of a given variable such as an activity, a behaviour, an event such as a data leakage event, or the like. In some cases, a risk measurement may be probabilistic in nature. For example, a risk measurement associated with a behaviour may be an expected value, also referred to as an expectation, taken over risk values corresponding to possible events, each risk value multiplied by a probability of the corresponding possible event occurring given the behaviour. In some cases, when only one possible event is associated with a nonzero risk value, this expected value reduces to said nonzero risk value multiplied by the probability of said event occurring, given the behaviour.

For further clarity, when an averaging operation is described as applying to a set of one or more values, and a given instance of the set includes exactly one value, then the averaging operation is understood as producing an output equal to said one value. This is consistent with standard formulations of weighted and unweighted averages.

As used herein, the term "cost" refers to a value, such as a scalar value but possibly a vector value, which is assigned manually, automatically by a predetermined set of rules, or a combination thereof. Costs may reflect a quantifiable value, such as monetary value, a relative or normalized value, or the like. In various embodiments a cost may reflect a normalized or un-normalized amount of risk, defined for example on a predetermined scale.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides various methods and systems related to the analysis of risks such as data leakage risks. According to some aspects of the invention, risk associated with a behavioural activity is measured as a function of certain component risk values which are computed or obtained from available data. One such risk value may represent risk ascribable to persons involved in performing the behavioural activity, such as organizational insiders or outsiders with access to sensitive data, and/or the activities of such persons. Another risk value may represent sensitivity of assets, such as digital files, comprising data associated with the risk. Yet another risk value may be associated with riskiness of an endpoint which receives such assets due to the behavioural activity, such as an external digital storage medium to which a digital file is transferred. Yet another risk value may be associated with a type of the behavioural activity, such as copying files, accessing files, viewing files, or the like. These risk values are combined together to provide an overall assessment of risk, using a predetermined function. This function may include parameters which are tunable manually, automatically, or both.

Figure 1:
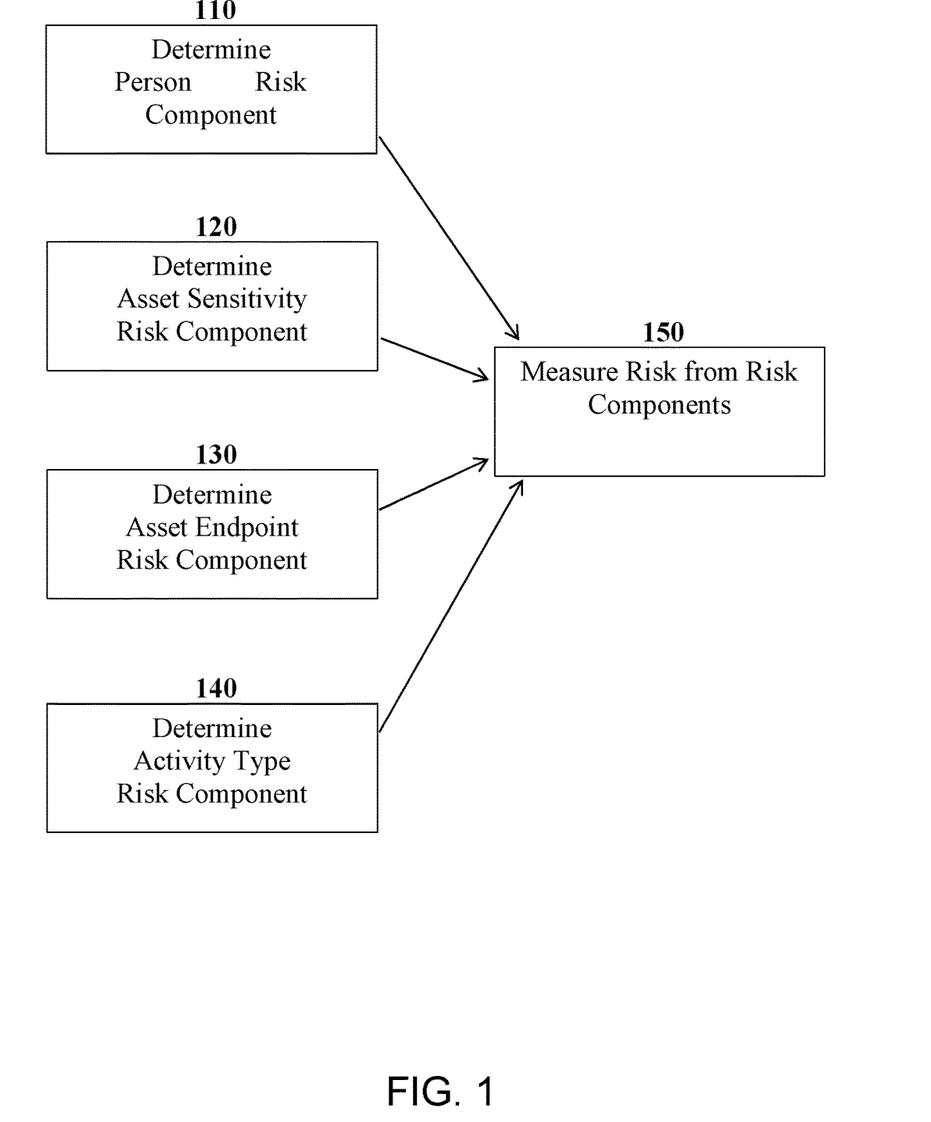
FIG. 1 illustrates a method for analyzing risks associated with behavioural activity, in accordance with some embodiments of the invention.

For example, FIG. 1 illustrates: determining 110 a risk component associated with persons involved in an activity; determining 120 a risk component associated with sensitivity of assets comprising data associated with the risk, which may for example be a data leakage risk; determining 130 a risk component associated with an endpoint which receives the assets due to the activity; determining 140 a risk component associated with a type of the activity; and measuring 150 the risk as a function of these components. For the purposes of the present invention, it will be readily appreciated that the term person in accordance to the present invention can understood to encompass any suitably entity, including but limited to people, machines or applications.

Various embodiments of the present invention are described with respect to data leakage risks. However, it is contemplated that other types of risks may be handled by embodiments of the present invention. For example, an employee visiting an online employment database may correspond to a behavioural activity which poses a risk to the skill base of the organization. Various behaviours that are undesirable to the organization may be analyzed and measures put into place to mitigate the downside risk which may result from such activities.

Figure 2:
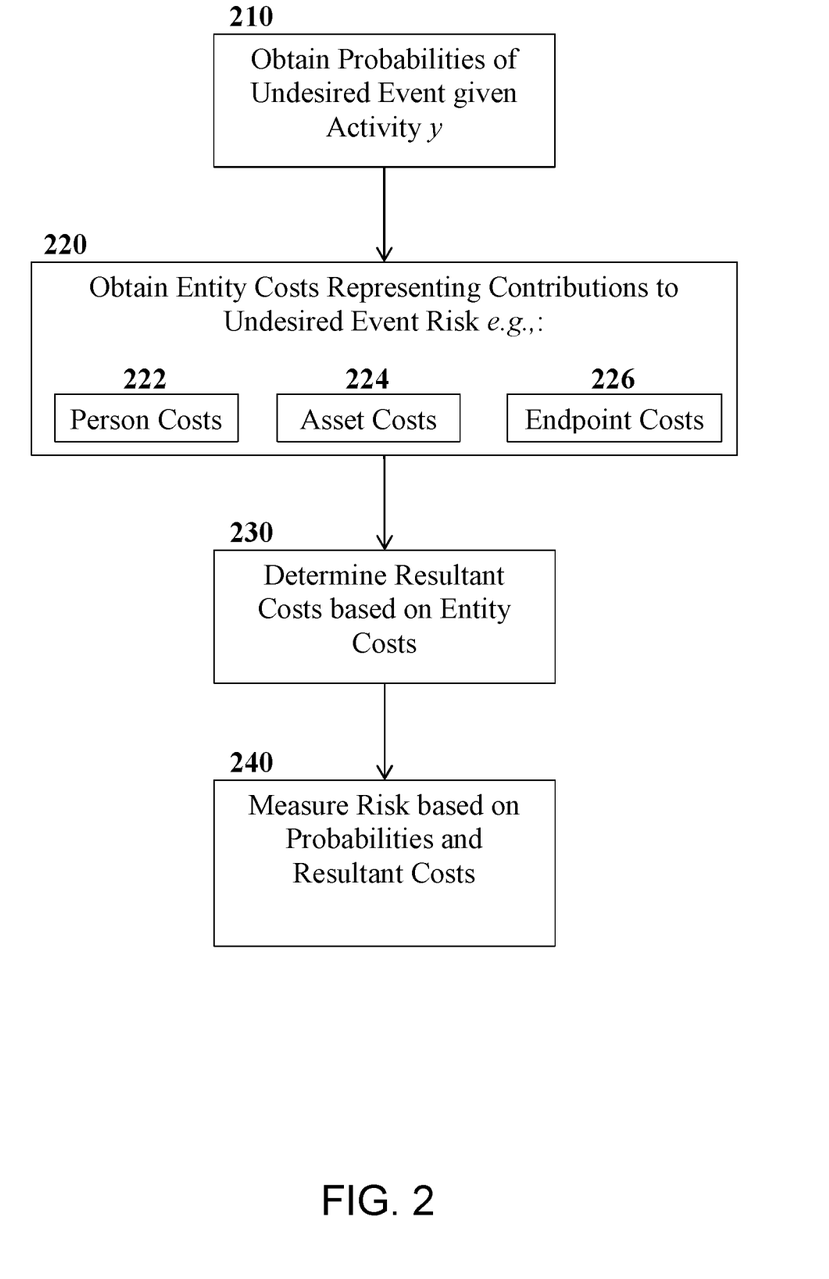
FIG. 2 illustrates another method for analyzing risks associated with behavioural activity, in accordance with some embodiments of the invention.

According to some aspects of the present invention, measuring risk associated with a behavioural activity comprises various operations which are generally described as follows, with reference to FIG. 2. One or more probabilities are obtained 210, with each probability being associated with a respective potential undesired event, such as a data leakage event. Each probability is a conditional probability, that is, the probability of the event given the observed activity. In some, but not necessarily all, embodiments, each of said probabilities is adjusted by multiplying it by a respective probability weighting factor. This weighing factor may be interpreted, for example, as the severity of a particular behaviour relative to another behaviour, among other arrangements that will be readily appreciated by the skilled person.

Further, for each potential undesired event, one or more entity costs are obtained 220. Each entity cost represents a contribution to the risk associated with a given type of entity associated with the activity. Types of entities may include persons interacting with data to be potentially leaked, assets comprising data to potentially be leaked, and endpoints to which the data to be potentially leaked is transferred, as mentioned above. These may be associated with person costs 222, asset costs 224, and endpoint costs 226, respectively. For each potential undesired event, a resultant cost is determined 230 as a function of the entity costs. This function may be a weighted average of the entity costs, for example. The risk is then measured 240 as an expectation over the one or more resultant costs distributed over the associated probabilities of potential undesired events. If there is only one nonzero resultant cost and/or one nonzero probability under consideration, the expectation reduces to multiplying this resultant cost by the associated probability to obtain the risk, for example an overall behaviour risk and/or data leakage risk.

In some embodiments of the invention, determining at least one of the entity costs mentioned above includes the following. A set of entities of the given type (e.g., person, application, asset or endpoint) is obtained, such that each member of the set of entities is associated with the behavioural activity under consideration. Each member of the set of entities is then associated with a sub-cost, for example through means that will be described elsewhere herein. The entity cost is then calculated as a weighted sum of the set of sub-costs, such that each sub-cost is weighted by a weighting factor equal to $2^{-i}$, where i corresponds to the ordinal position of said sub-cost relative to the set of sub-costs when the set of sub-costs is sorted in order of nonincreasing value. Thus, the highest sub-cost is divided by 2, the second highest sub-cost is divided by for, and so on, and the results are added together to derive the entity cost.

Figure 3:
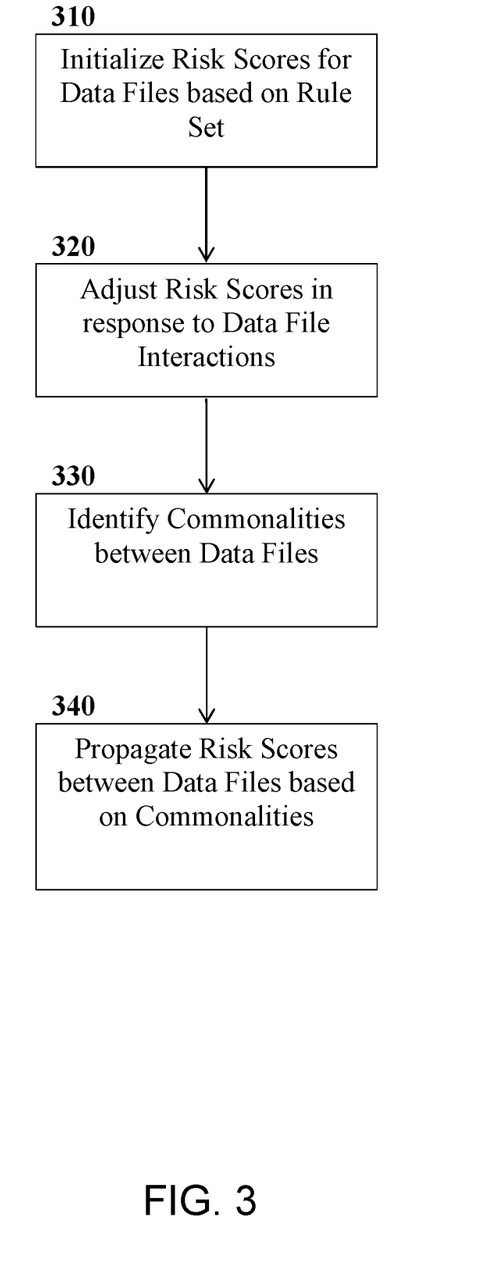
FIG. 3 illustrates another method for analyzing risks associated with data files, in accordance with some embodiments of the invention.

According to some aspects of the present invention, risk, such as data leakage risk, associated with data files within a population is measured. Such measured risks may be used in calculating behavioural risks as described elsewhere herein, for example forming the sub-costs as mentioned above. Alternatively, such measured risks may be used for other purposes or as a stand-alone risk measurement. With reference to FIG. 3, measurement comprises initializing 310 risk scores of the data files based on a rule set. For example, the risk scores may initially be set based on file type, location, author, owner or user, keywords, filename pattern, metadata, or the like, or a combination thereof. The risk scores are then adjusted 320 in response to ongoing interaction with the data files. Adjustments may be made based on operator input, events associated with file interactions, or the like. Further, commonalities across data files may be identified 330. For example, a commonality may arise when data from a first file is copied to a second data file. The data copied may correspond to all or a portion of the information contained in the first file. The second file may be in a different format from the first file, for example it may be a picture file, compressed file, encoded file, or the like. As another example, a commonality may arise when a compressed or encoded version of a file is made. As another example, a commonality may arise when data files have common owners, users, keywords, locations, metadata, or the like. Commonalities may be identified using clustering operations. Further, risk scores are propagated 340 between data files based on said identified commonalities. For example, the risk score of a file, such as an existing or newly created file, may be set so that it is similar to the existing risk scores of other files which share commonalities with the first file.

Figure 4:
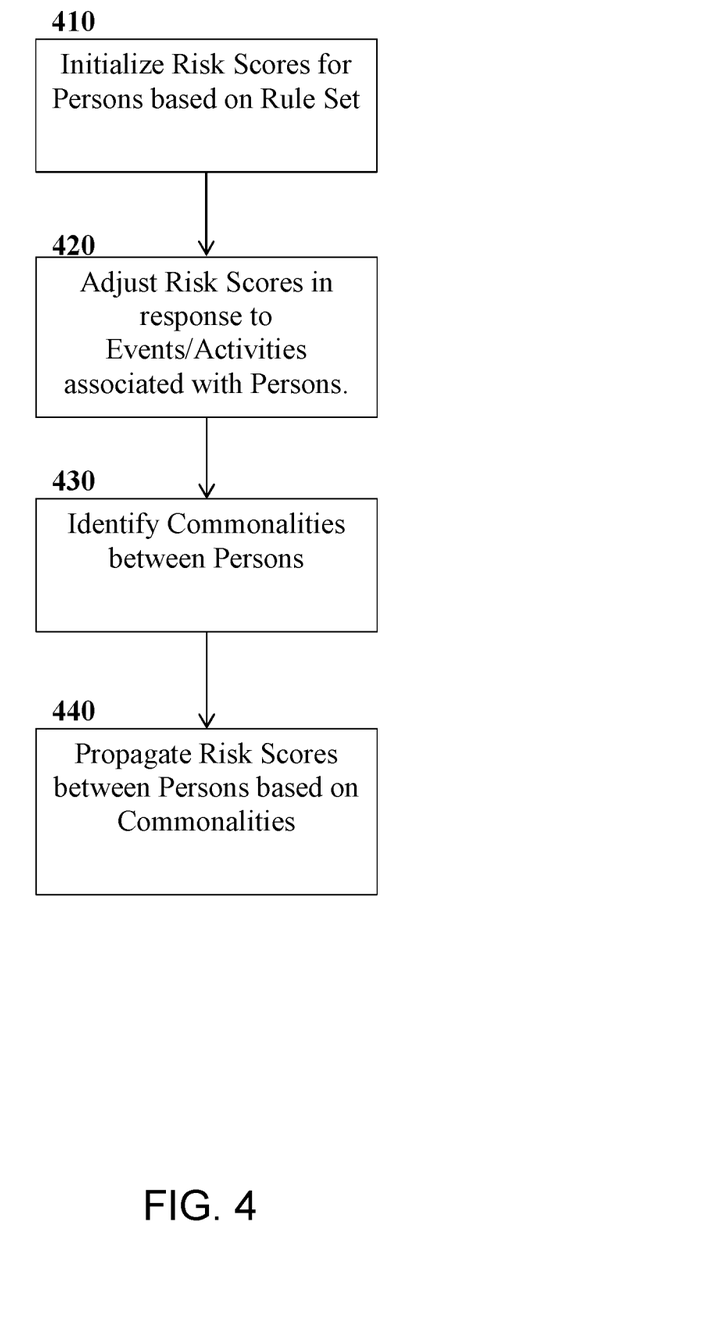
FIG. 4 illustrates another method for analyzing risks associated persons within a population, in accordance with some embodiments of the invention.

According to some aspects of the present invention, risk, such as data leakage risk, associated with persons within a population, such as persons with access to sensitive data, is measured. Such measured risks may be used in calculating behavioural risks as described elsewhere herein, for example forming the sub-costs as mentioned above. Alternatively, such measured risks may be used for other purposes or as a stand-alone risk measurement. Measurement may be performed similarly to measurement of file risk as described elsewhere herein. With reference to FIG. 4, measurement comprises initializing 410 risk scores of the persons based on a given rule set. For example, the risk scores may initially be set based on a person's position within an organization, their affiliations with other organizations, history with data breach offenses, their privileged access to sensitive information, and the like. The risk scores are then adjusted 420 in response to ongoing monitoring of events associated with activities of said persons. Adjustments may be made based on operator input, events such as adding people to watch lists, events associated with a person's actions, or the like. Further, commonalities across persons within the population may be identified 430. For example a commonality may arise when two people work together on a project, interact or share information. Commonalities may be identified using clustering operations. Further, risk scores are propagated 440 between persons based on said identified commonalities. For example, the risk score of a first person may be set so that it is similar to the existing risk scores of other persons who interact with and/or share commonalities with the first person.

In some embodiments, the rule set used to initialize risk scores may be adjusted based on the adjustments to risk scores of given persons or data files, for example as described above. This may be used to cause the rule set to assign more appropriate risk scores in the future, for example when initializing risk scores for newly created persons or data files.

In some embodiments, predictive modeling may be used to identify commonalities across similar data files or persons. The predictive models may be based on the clustering operations, for example, and may identify signatures which are predictive of high-risk entities.

Various embodiments of the present invention comprise monitoring and observing actions and behaviours of actors such as persons and computers, analyzing the monitored data to identify potential risks, and optionally acting on the outcome of said analysis. Monitoring and observation may comprise monitoring of computer-related activities, such as computer commands entered by a person, computer scripts or routines which are automatically or manually, locally or remotely initiated on certain computing assets, and the like. Monitoring and observation may result in a stream of observable data which may be analyzed in real time, stored in memory for later analysis, or a combination thereof. Analysis may be performed using computers which receive and process the observable data, and may be performed at a centralized location or by plural computers operating in a coordinated but distributed fashion. Acting may comprise alerting operators of potential data leaks, the operators taking subsequent preventive or reactive actions for example as prescribed in a manual. Acting may additionally or alternatively comprise automatic operations, such as disconnecting a computer, recalling messages, taking portions of a communication network offline, temporarily restricting or revoking privileges of a person, or the like.

In various embodiments, risk scores are determined for various matters, such as various behaviours, persons, files, or the like, and the risk scores are then ranked, for example from highest to lowest. The ranked risks are then presented in order to an operator and/or addressed automatically, for example in a manner which addresses the highest risk matters first. In some embodiments, when a risk score exceeds a predetermined threshold value, the associated matter is presented to an operator and/or addressed automatically. In some embodiments, the matters associated with the N relatively highest risk scores are presented and/or addressed, where N is a predetermined number. Presentation and addressing of matters may be performed on a periodic and/or ongoing basis.

Risk Associated with Behavioural Activity

Various embodiments of the present invention utilize behavioural analytics to mitigate risks, such as but not necessarily limited to data leakage risks, associated with data such as unstructured, possibly sensitive data stored within computer systems. Such data may be subject to various potentially risky but identifiable activities. For example, sensitive files may be compressed and uploaded to an external computer or server; a user may run an unusual or unexpected set of applications or operations; screenshots may be taken of sensitive data such as spreadsheets; a user may access source code files from an unusual time and location; a computing machine may exhibit anomalous networking or computing behaviour; a user may deviate from a normal behavioural work pattern; a user may spend unusual amounts of time working with specific documents or specific applications; applications may be opened and/or closed in an unusual pattern and/or at unusual times; or an employee may unexpectedly access a number of sensitive data files outside the realm of their normal duties. These and other activities or patterns of activity may represent behavioural risk indicators, which may, for example, be indicative of potential data leakage. The amount of risk can vary. For example high-risk activities may indicate malicious data theft or careless use of data, while low risk activities may be in line with normal behaviour given current circumstances within the organization.

High-risk activities may arise from intent to exfiltrate data in an unauthorized way. However, in various embodiments, intent is not required. For example, careless handling of data, such as neglecting to secure printouts or electronic memory components carrying confidential information, neglecting to properly secure passwords, or the like, may be considered high-risk activities which require addressing.

In various embodiments, there is a quantifiable risk element associate with the involved person or persons: certain people, when associated with an exfiltration of data, for example, may present a relatively higher risk to an organization by virtue of the knowledge they have, their position within the organization, their access to sensitive data such as intellectual property, or the like. Component risk values may represent the amount of risk ascribable to activities that involve a given person, relative to another given person. The person risk may in some cases be related to trustworthiness of the person, for example. These statements can also apply to machines, such as a computer server that is used to provide valuable content (such as source code or documents).

Another component risk value may represent sensitivity of assets comprising data associated with the risk. Certain digital file assets may contain more sensitive information, such as trade secrets, unpublished intellectual property, potentially negative information from a public relations perspective, information which, if published, would result in a loss of competitive advantage for the organization, or the like. The asset risk may be proportional to the potential negative impact due to leakage of that asset.

Yet another component risk value may be associated with riskiness of an endpoint which receives such assets due to the behavioural activity. Copying files to a portable device such as USB memory stick may be considered risky, particularly if such devices are banned within an organization. Likewise, uploading files to an external server or publicly accessible location may be considered risky, for example from a data leakage perspective. Even displaying files on a screen carries some risk, as a user may take photographs of the screen. In particular, displaying pages of a file on screen and in rapid succession may be deemed risky as it suggests a user may quickly be taking photographs or video of each page.

Yet another component risk value may be associated with a type of the behavioural activity. The activity component may represent how much the observed behaviour deviates from normal, baseline behaviour. For example, copying sensitive files to a USB memory stick may be considered an unusual and risky behavioural activity, while copying files to an internal personal directory or emailing a file internally may be considered less risky.

In some embodiments, some or all input component risks may be simple values or functions of other parameters, such as the organization, the time of day, the associated entities, or the associated location. For example, the endpoint risk value associated with USB thumbdrive usage, when done at an offshore development company, may be higher than when done at a domestic location. As another example, the component risk associated with a financial document may increase during the last week of a fiscal quarter, but then diminish after the end of the fiscal quarter.

It is contemplated that a given behavioural activity may involve zero to several people, zero to several assets, and/or zero to several endpoints. For example, a computer may perform risky behaviour when operated remotely by an unidentified entity. Multiple persons may conspire in a behaviour. A file may be sent to multiple endpoints. Embodiments of the present invention therefore accommodate variable numbers of entities.

Various functions may be employed to map input component risk values to a value representing the risk. In various embodiments of the invention, the function corresponds to a general function which is tuned using various parameters, such as weighting values which are multiplied with the component risk values. These weights may be adjusted, for example to increase or decrease the relative importance of a component risk value. By adjusting the parameters, the general function can be customized for use within a particular organization, in accordance with the particular characteristics, needs, and/or sensitivities of that organization. Adjustment of parameters may be performed manually, automatically, or a combination thereof.

In some embodiments, parameters may be adjusted or "tuned" while the system is online, in order to improve performance over time. For example, when risk values are deemed inaccurate by an operator or inconsistencies are found, the parameters may be adjusted so that more accurate risk values are output in the future. Such tuning may be performed using machine learning techniques, feedback techniques, or the like. In some embodiments, tuning may incorporate operator input as well as automatic tuning. In other embodiments, tuning may be fully automated based on computer operations.

For example, if an organization bans hardcopy printouts of sensitive material, then the weighting parameter associated with this activity may be increased. In contrast, if an organization routinely uses hardcopy printouts, then the corresponding weighting parameter may be decreased.

Parameters, such as weights, can be adjusted based on policy, intuition, predetermined rules, or the like. Parameters can be adjusted explicitly or implicitly. For example, user-generated operations such as adding people to a watch list or going through a tuning dialog to establish that a file is not important may cause an adjustment of parameters. Parameters may be automatically adjusted through automated operations such as clustering. For example, if a clustering method uncovers important files, weighting parameters indicative of importance of those files may be increased.

In various embodiments, a parameter may comprise a user-generated component and a system-generated component. The user-generated component is controllable by users such as administrators, for example according to user preferences, while the system-generated component is generated automatically. In some embodiments, the system component represents risk whose calculus can be described as the result of underlying and irrefutable observations. In some embodiments, the parameter may be derived from the two components, for example by taking a weighted average of each, with the weighting being either a user-defined meta-parameter or a system-defined meta-parameter. For example, entity sub-costs $R_x$, such as appear in Equation (2), may be calculated as a function of a system-defined entity sub-cost $S_x$ and a user-defined entity sub-cost $U_x$. In particular, $R_x$ may be defined as a weighted average of $S_x$ and $U_x$, according to a predetermined weighting meta-parameter, which may be used to tune the balance between system-defined and user-defined sub-costs.

In some embodiments, parameters, such as weights, may be determined via a predetermined function or computational routine. Such functions may vary in complexity and output parameter values which vary based on certain inputs. Inputs may reflect times, dates, locations, identities, and a variety of other variable features. For example, a parameter may reflect an indication that a particular anomalous activity is only important for the CFO, during the last week of the quarter. As another example, a parameter may reflect an indication that the impact of certain files to an activity is particularly important only for certain endpoint locations within certain countries or geographic regions.

In some embodiments, a behavioural risk score $R_{behaviour}$ is determined as follows:

$$R_{behaviour} = P(event|y) w_Y \frac{w_P \sum_{i \in I(P)} 2^{-i} R_{p[i]} + w_A \sum_{j \in I(A)} 2^{-j} R_{a[j]} + w_E \sum_{k \in I(E)} 2^{-k} R_{e[k]}}{w_P + w_A + w_E}. \quad (1)$$

In Equation (1), P(event|y) is a predetermined conditional probability of a given undesirable event, such as a data leakage event, given observed behavioural activity y. These probabilities may be observed, estimated or predicted through various means, for example through analysis empirical data, situational modeling, Bayesian network calculations, or other estimation procedures. Parameters $w_Y$, $w_P$, $w_A$ and $w_E$ are weighting factors for the event probability, person cost, asset cost and resultant cost, respectively. For some events, for example indicating whether or not an exfiltration has occurred, there may be 100% confidence that the event has occurred, in which case the probability may be assigned a value of one. For other observed events, models may be used to determine how unusual the underlying activity y is. Some embodiments may assign a higher probability P for more unusual activities y. For example, if activity y corresponds to a user emailing a certain number of files during a time period (e.g., in one day), then the probability of an undesirable event occurring may be an increasing function of the number of files. For example the probability may be low if the number of files is typical for the user, higher but still relatively low if the number of files is 2 to three times more than the typical number, and relatively much higher if the number of files is 10 to 20 times more than the typical number. The probability can increase linearly or nonlinearly.

In various embodiments, the probabilities P(event|y) are calculated for various given negative events, such as file exfiltrations, and for various observable anomalous activities. The probabilities may not be calculated for all possible event/activity combinations, but rather may focus on those with the highest potential for harm, for example due to data leakage. Anomalous activities may be defined as those which differ significantly from normal, baseline activity. Such activities may be indicative that a negative behavioural event, such as a data leakage event, may have occurred, is occurring, or will occur.

One example of an anomalous activity is an unusually large volume of data copying. For example, for a user who typically copies 5 to 10 MB of data per day, copying 2 GB of data rather may be regarded as an anomalous activity and probabilities P(event|y) may be computed for such observed activities y.

In some embodiments, the probability of an undesirable event may be estimated based on the distance between an established baseline activity level and a currently observed activity level. The activity level may be, for example, an amount of data copied, number of files copies or emailed, or the like. The greater the distance from the baseline, the higher the estimated probability. In some embodiments, distance in one direction (e.g., more files copied than usual) may be considered. In some embodiments, distance in both directions (e.g., more or fewer files copied than usual) may be considered.

In some embodiments, the established baseline activity level may be represented by a distribution, such as a Gaussian distribution with a mean activity level and an activity level variance. The distribution may be established based on an activity history for a given person or a class of persons in a given role. As the activity level deviates from the mean, the probability P(event|y) may increase as a function of the distance from the mean of the distribution divided by the variance or standard deviation of the distribution.

In some embodiments, the probability P(event|y) for a given activity level y, such as an observed volume of data being copied, is estimated as follows:

$$P(event|y) = \frac{P_1(y)}{P_1(y) + P_2(y)},$$

where $P_1(y)$ and $P_2(y)$ are probability distributions evaluated at y. In particular, $P_1$ models the probability that the activity level y corresponds to a "good," standard or otherwise acceptable type of activity, while $P_2$ models the probability that the activity level y corresponds to a "bad," malicious, negligent or otherwise unacceptable type of activity. The distributions $P_1$ and $P_2$ may be of a predetermined type, such as gamma distributions. The distributions may be assigned predetermined parameters, such as those determinative of means and variances. The distribution type and/or parameters may be determined or learned automatically from data. For example, the Expectation-Maximization algorithm may be used to learn the distribution and/or parameters thereof from data provided.

In some embodiments, $P_1$ and $P_2$ are set as the following Gaussian distributions:

$$P_1(y) = (1-s)\frac{1}{\sigma\sqrt{2\pi}} e^{\frac{-(y-\mu)^2}{\sigma^2}};$$

-continued $$P_2(y) = s \frac{1}{\sigma\sqrt{2\pi}} e^{\frac{-(y-\mu-\sigma)^2}{\sigma^2}}.$$

Here, $\mu$ and $\sigma$ are mean and variance parameters, respectively, and s is a prior "bad" parameter, for estimating the proportion of observations that are bad or anomalous. Parameters may be small, for example 0.001. It is noted that $P_2$ has a mean which is offset by one standard deviation from that of $P_1$. This may be interpreted in that the anomalous behaviour is required to be one extra standard deviation away from the mean. The above approach can be generalized to a large number of useful anomalous activities. For example, given historic or comparable observed activities that can serve as a baseline, such as historical amounts of data copied in a given time period, the observed distance between the currently observed activity and the baseline level allow for computation of the probability P(event|y).

In some embodiments, each of these weighting factors in Equation (1) may be bounded between zero and one, inclusive. Parameter $w_y$ adjusts the probability, if desired. The person cost, asset cost and resultant cost are referred to as entity costs. The fraction represents the resultant cost, which is a weighted average of the entity costs. In some embodiments, each of the weighting factors may be learned in response to feedback from another system or a human operator. For example, if given information about the desired risk of an observed behavior, the difference between the desired risk and the current risk given the current weighting factors, an algorithm can be used to adjust the weights using methods such as gradient descent.

As can be seen, each entity cost is of the form:

$$C(X) = \Sigma_{i \in I(X)} 2^{-i} R_{x[i]}. \quad (2)$$

In this notation, X represents the set of entities (e.g., person, asset, endpoint) under consideration, I(X) is the set of natural numbers from 1 to $\|X\|$, $R_x$ represents an entity sub-cost corresponding to each entity x selected from the set X, and x[i] represents the entity x having $i^{th}$ largest value $R_x$. Thus, $R_{x[i]}$ represents the $i^{th}$ largest sub-cost over all elements in the set X. X can be replaced with P, A or E to denote the appropriate type of entity, and likewise x can be replaced with the corresponding lowercase letter for consistency. The sets P, A and E refer to the sets of persons, assets and endpoints under consideration, and may be empty sets. In various embodiments, the $R_x$ terms have values between 0 and 1, inclusive.

Indexing through the set of entity risks in descending order as in Equation (2) results in higher entity risks being considered, scored, and given the highest weights, before lower entity risks. As a result, C(X) is always nondecreasing as additional entities become involved in the activity. For example, emailing a second risky file results in an increased cost following emailing of a first risky file. Furthermore, C(X) is sublinear with respect to the number of entities involved, so that, for example, emailing additional risky files adds more risk, but not necessarily as much risk as the first file. The riskiest events are weighted most heavily. Further, the inverse binary weights cause C(X) to be bounded between 0 and 1 if the individual sub-costs are also bounded between 0 and 1. This is because the binary weights correspond to the terms of a harmonic series which sums to one. Furthermore, when a large number of sub-costs are involved, truncation or ignoring of the lowest sub-costs only results in a small error, since the weighting of sub-costs decreases quickly. For example, if but C(X) is estimated using only the ten highest sub-costs, then, assuming all sub-costs are bounded between 0 and 1, the estimation error is at most about $2^{-10}$.

Generally speaking, $R_{behaviour}$ is an increasing function of the individual risks $R_p$, $R_a$, $R_e$, for p, a and e as elements of P, A and E, respectively. The higher the input component risks, the higher the overall behaviour risk.

In some embodiments, Equation (1) can be expanded by considering plural undesirable events, for example data leakage events or data leakage events mixed with other types of events. In this case the right-hand side of the equation is replaced by a summation over all events being considered, with each term in the sum being identical in form to the right-hand side of (1), but each term corresponding to a different event, and possibly having different values for the various terms. This produces an expectation over resultant costs distributed over their associated conditional probabilities given behavioural activity y.

Equation (1) may be interpreted as the risk score $R_{behaviour}$ being equal to the probability P(event|y) (optionally adjusted by weight $w_y$) multiplied by a resultant cost or risk value C(event). This is consistent with expected utility theory and standard risk models such as OWASP. The aggregate risk may therefore correspond to the probability that an event of negative impact occurred multiplied by the cost of that event. This balances a measure of negative impact of an event with the confidence level that the event occurred. The resultant cost C(event) in Equation (1) is given by the fraction, as a weighted average of the entity costs C(P), C(A), C(E), each of which are given by the form of Equation (2). Provided the entity costs and weights are bounded between 0 and 1, the resultant cost will also be bounded between 0 and 1.

In various embodiments, the exfiltration of an unimportant file will result in a low value for the resultant cost, exfiltration of an important or sensitive file will result in a high value for the resultant cost. This may be realized through the entity costs C(A), for example.

Risk Associated with Data File

As mentioned above with reference to FIG. 3, some aspects of the present invention provide for measurement of risk associated with data files, such as but not necessarily limited to data leakage risk. Measurement comprises initializing risk scores based on a rule set, adjusting the risk scores in response to ongoing interaction, and propagating risk scores between data files based on identified commonalities.

Generally, the risk score $R_a$ associated with an asset such as a data file are assigned such that relatively high scores (for example close to one) are assigned to files which, if leaked, would generate significant negative consequences, while relatively low scores (for example close to zero) are assigned to files which, if leaked, would not generate significant negative consequences.

Initializing risk scores based on a predetermined rule set may be performed in order to assign an initial assessment of risk. For example, in some organizations, file types identified by extensions such as .xls, .c, .cpp and .java may initially be given high scores. As another example, files stored in given locations such as privileged shared directories or source code repositories may initially be given high scores. As another example, files generated, owned, edited or viewed by a given important person or department, such as the CFO or HR department may initially be given high scores. As another example, files marked "Confidential," "Internal Only," containing certain keywords in the title, filename, or description, or the like, may initially be given high scores. Furthermore, combinations of the above may be employed to generate high or even higher scores. For example, all .xls files from the CFO may be assigned top level risk scores. Boolean functions based on multiple criteria may be used to assign initial risk scores.

Following initialization, risk scores may be adjusted automatically or based on operator input. Adjusting risk scores based on operator input may be explicit, for example by directly tuning the risk scores by an administrator, or implicit, for example by adjusting the risk scores based on input or actions. For example, if security personnel dismisses an alert of a potential undesirable event and indicates that the reason is that the underlying file is deemed unimportant, the risk score for that file may be lowered. If, on the other hand, security personnel adds a file to a watch list or performs other security activities around that file, then the risk score may be raised. In some embodiments, the raise may persist even after the security watch or security activities cease.

In some embodiments, risk scores may be automatically adjusted based on computer operations such as machine intelligence or machine learning operations. For example, the stream of observed behaviours related to files may be processed and used to tune the risk scores automatically.

As an example, if a screenshot of an important parent file is taken and embedded within another file such as a slideshow presentation, that presentation may inherit the same or a similar importance score as the parent file. Importance or risk scores may flow between files based on interactions or dependency graph-based relationships. As another example, as important people interact with files, importance or risk may flow from the person to the file. Likewise, if a person interacts with an important file, importance or risk may flow from the file to the person.

In various embodiments, adjustment of risk may be based on graph models of the files and their environment. Each file may be represented as a node in a graph, with nodes being interconnected when they exhibit a commonality, such as common data, common user, common location, or the like. Importance or risk may flow between connected nodes in the graph, for example in the sense that the risk score assigned to a given node is influenced by the risk score of connected nodes.

In various embodiments, clustering operations, predictive modeling operations, or other data mining or machine learning operations may be used to identify similarities or commonalities between files, and to subsequently adjust the risk scores of files so that similar files have similar risk scores. Clustering operations may be performed based on file content or other data such as location, association with a person or persons, metadata, or the like.

In various embodiments, risk scores may be propagated between files, for example between graph nodes as described above or between files identified as belonging to the same cluster, or a combination thereof.

In some embodiments, analytical operations such as clustering may be performed on important files to identify what is common across those files. Once common signatures or patterns are identified, other additional files, such as new or existing but not fully analyzed files, may be analyzed for the presence of these signatures or patterns. Where these are found, similar importance or risk can be assigned to these additional files. This type of pattern recognition may be used to predict importance or risk of files. This corresponds to a type of propagation of risk score between files based on identified similarities between files.

For example, a set of important files may be analyzed in order to discover identifying signatures such as: spreadsheets created by the CFO during the last week of each quarter; documents from the HR department that have been marked as Confidential; Anything read by the CEO that was sent to him via email; All *.c files created by a developer using a certain application. Clustering models may be used to predict and find other important files based on their similarity to known important files. These predictions may use information that arrives from observed behaviors and events such as users opening, modifying and creating files. This incoming, real-time behavioral information facilitates assigning risk scores to files as they are being created, used, consumed by specific people, copied to certain locations, and the like.

Risk Associated with Person

As mentioned above with reference to FIG. 4, some aspects of the present invention provide for measurement of risk, such as but not necessarily limited to data leakage risk, associated with persons. Measurement comprises initializing risk scores based on a rule set, adjusting the risk scores in response to ongoing monitoring and/or person interactions, and propagating risk scores between persons based on identified commonalities.

In various embodiments, a person's risk score may reflect how much of a measurable risk can be associated with behaviours involving that person. The risk score may be computed based on data such as: identity of the person, role of the person, actions and behaviours performed by the person, access and privileged afforded to the person, and the like.

In various embodiments, risk scores of a population may be initialized based on roles and importance within the organization. As an example, C-level executives and their administrators, HR personnel, software developers with access to privileged source code repositories, departments with privileged access, known prior offenders, and the like, may be assigned high risk levels.

In various embodiments, risk scores may be adjusted automatically based on feedback, machine intelligence, via user input, or the like, or a combination thereof. For example, as security personnel respond to alerts and/or fine-tune weights, as they add people to watchlists, and the like, machine learning may be employed to adjust the people risk scores accordingly. As an example, when an important person frequently exchanges data with another person, that second person becomes more important and risk propagates between the two people. As a result, importance and risk are refined and distributed across a larger set of people.

In various embodiments, predictive models may be used to identify commonalities across similar, important people. These signatures allows us to build clustering models to re-compute and predict the importance and risk score of a person, based on characteristics such as their role, position and behavior. Such computation may be performed in real-time as those persons perform behaviors within the organization.

Various aspects of the present invention may be implemented as a method performed by a computer or set of communicatively coupled computers. Each computer may comprise one or more microprocessors operatively coupled to memory, the memory containing program instructions for directing the microprocessor or microprocessors in carrying out the operations according to the method. Computers may be configured to calculate risk scores, adjust risk scores, and propagate risk scores. Computers may be configured to monitor operations performing using those computers using other computers, such as behavioural activities. For example, each computer in an organization may comprise a monitoring application configured to monitor for and report certain behavioural activities by monitoring interactions with the computer.

Various aspects of the present invention may be implemented as a computer or system of computers, which are configured to operate as described herein. Each computer or system of computers may comprise one or more modules, such as monitoring modules, processing modules, data storage modules, reporting modules, user interface modules, and the like. The system may be configured to monitor activities of users and computers, process and store data resulting from such monitoring, as described herein, interact with users such as security personnel, adjust and adapt risk scores over time, automatically initiate security countermeasures, and the like.

Figure 5:
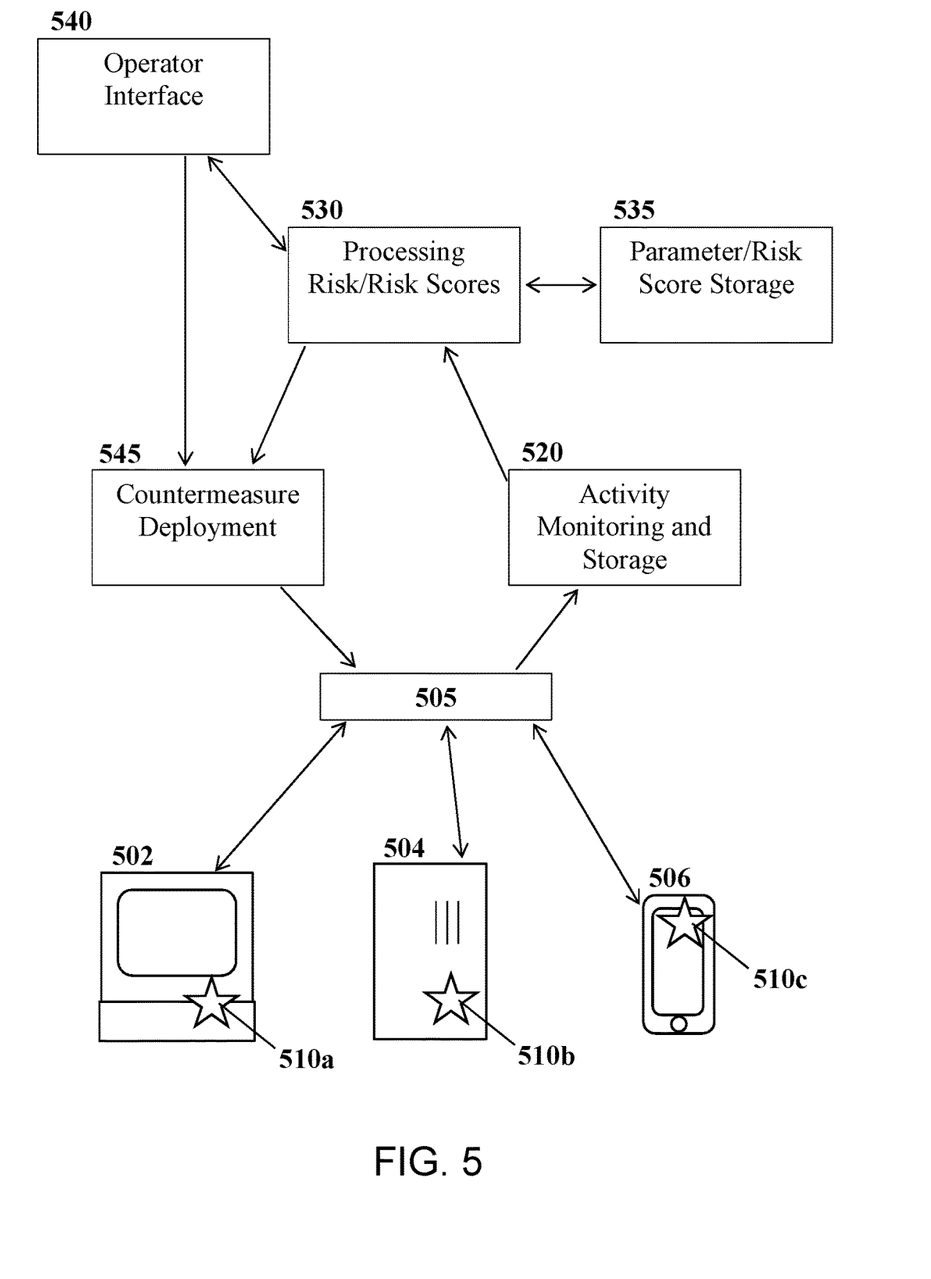
FIG. 5 illustrates a system for monitoring and analyzing risks, in accordance with some embodiments of the invention.

FIG. 5 illustrates a system provided in accordance with an embodiment of the invention. Activities associated with various electronic devices, such as a desktop computer 502, a server 504, and a portable device 506 are monitored via monitoring modules 510a, 510b, 510c installed on or with access to the devices. For example, the monitoring module may operate remotely from the device but may nevertheless have access to the device sufficient to monitor activities thereon. Monitoring modules may comprise hardware components, software agents, or the like, or a combination thereof. In some embodiments, a monitoring module may monitor output of the device, for example via wired or wireless communication links, I/O ports, output to screen, audio output, or the like. Content of such output may be processed and activities deemed noteworthy may be communicated for further analysis. A communication node 505 is configured to receive reports from the monitoring modules and pass these on to an activity monitoring and storage module 520. The activity monitoring and storage module is configured to monitor activities of the various electronic devices, for reporting to the processing module 530, and optionally to store activity events for later processing, for example if certain lower-priority activities cannot be processed immediately. The processing module 530 is configured to process behavioural activities in order to determine risk, to process data in order to assess file risk, person risk, or the like, or a combination thereof. The processing module may store parameters and/or risk scores in a parameter/risk score storage module 535, and draw from said storage module as required for processing risk and/or risk scores. Output of the processing module may be directed to an operator interface module 540 for ongoing monitoring and/or alerting operators of potential risks. Operator input may be transmitted back to the processing module, for example for use in adjusting the value of stored parameters and/or risk scores. A countermeasure deployment module 545 may be provided, which is operated via operator input and/or automatically by the processing module. The countermeasure deployment module may be used to communicate with the devices 502, 504, 506 for example in order to disable a device, delete data from the device, alter operation of the device, or the like.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a solid or fluid transmission medium, magnetic or optical wire, tape or disc, or the like, for storing signals readable by a machine, for controlling the operation of a computer and/or firmware according to the method of the technology and/or to structure its components in accordance with the system of the technology.

In addition, while portions of the above discuss the technology as it can be implemented using a generic OS and/or generic hardware, it is within the scope of the present technology that the method, apparatus and computer program product of the technology can equally be implemented to operate using a non-generic OS and/or can use non-generic hardware.

Further, each step of the method may be executed on any general computer, such as a personal computer, server or the like, or system of computers, and pursuant to one or more, or a part of one or more, program elements, modules or objects generated from any programming language, such as C++, C#, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A computer-implemented method for determining risk of data loss or data leakage associated with a selected behavioral activity associated with one or more digital data files stored within a secure data environment, the method comprising:

monitoring, by a microprocessor, ongoing interaction with the one or more digital data files;

determining, by the microprocessor, a first risk component measuring a risk of data loss or data leakage associated with one or more of a person and computing machine involved in performing the selected behavioral activity;

determining, by the microprocessor, a second risk component associated with sensitivity of data contained in the one or more digital data files, the second risk component being a measure of sensitivity of the one or more digital data files accessed by the selected behavioral activity;

determining, by the microprocessor, a third risk component measuring a risk of data loss or data leakage associated with an endpoint which receives the data contained in the one or more digital data files due to the selected behavioral activity;

determining, by the microprocessor, a fourth risk component associated with a type of the selected behavioral activity, the fourth risk component being a measure of a degree of deviation of the selected behavioral activity from a normal, baseline behavior;

measuring, by the microprocessor, an aggregate risk associated with the selected behavioral activity as a function of the first risk component, the second risk component, the third risk component, and the fourth risk component;

in response to the measuring, acting, by the microprocessor, to mitigate the measured aggregate risk associated with the selected behavioral activity; and wherein the measured aggregate risk associated with the selected behavioral activity provides an indication of probability of data loss or leakage and/or consequences of data loss or data leakage from the one or more digital data files as a result of the selected behavioral activity.

2. The method of claim 1, wherein the monitoring comprises the microprocessor monitoring a computer command entered by a person and a computer script or routine that is initiated on a selected computing machine and further comprising:
automatically tuning, by the microprocessor, parameters of the function;
ranking, by the microprocessor, measured aggregate risks from highest to lowest; and
presenting, by the microprocessor, the ranked measured aggregate risks in order to an operator.

3. The method of claim 2, wherein the first, second, third or fourth risk components each correspond to a probability that an event of negative impact may occur multiplied by a respective cost associated with the event, wherein the respective cost is a function of a respective system-defined entity sub-cost and a respective user-defined entity sub-cost, and wherein the parameters include one or more weighting factors each multiplying a respective one of the first risk component, the second risk component, the third risk component, and the fourth risk component.

4. The method of claim 1, wherein the acting comprises the microprocessor one or more of:
alerting an operator of a potential data leak,
disconnecting a computer,
recalling a message,
taking a portion of a communication network offline,
temporarily restricting or revoking privileges of a person, and
combinations thereof and further comprising:
manually tuning parameters of the function; and
the microprocessor applying the following rules:
when a measured aggregate risk score exceeds a predetermined threshold value, the associated selected behavioral activity is presented to an operator and/or addressed automatically; and
when a measured aggregate risk score is below a predetermined threshold value, the associated selected behavioral activity is not presented to the operator and/or addressed automatically.

5. The method of claim 1, wherein the selected behavioral activity corresponds to a plurality of potential undesired events and further comprising, for each of a plurality of the first, second, third and fourth risk components:
obtaining, by the microprocessor, one or more probabilities, each probability of the one or more probabilities being a conditional probability associated with a selected potential undesired event of the plurality of potential undesired events;
adjusting, by the microprocessor, each of the one or more probabilities by multiplication with a respective probability weighting factor indicating a severity of the corresponding selected potential undesired event relative to others of the plurality of potential undesired events;
for each potential undesired event of the plurality of potential undesired events, obtaining, by the microprocessor, one or more entity costs, each entity cost representative of a contribution to the risk associated with a given type of entity associated with the selected behavioral activity;
for each potential undesired event of the plurality of potential undesired events, determining, by the microprocessor, a corresponding resultant cost as a function of the entity costs; and
measuring, by the microprocessor, the risk as an expectation over the corresponding resultant costs distributed over the associated probabilities of the plurality of potential undesired events.

6. The method of claim 5, wherein a single nonzero event risk value is determined and a single corresponding conditional probability of the selected potential undesired event given a behavior is obtained, wherein each of the probability weighting factors is bounded between zero and one, inclusive, and wherein the probability weighting factor is associated with the potential undesired event corresponding to the conditional probability being adjusted by multiplication with the probability weighting factor.

7. The method of claim 5, wherein the function of entity costs associated with the selected potential undesired event is a weighted average of entity costs associated with the selected potential undesired event, wherein each weighting factor associated with the weighted average is bounded between zero and one, inclusive, and wherein the probability weighting factor is defined automatically, defined via user input, or a combination thereof.

8. The method of claim 5, wherein the given type of entity corresponds to a set of persons interacting with data to potentially be leaked, an asset comprising the data to potentially be leaked, and an endpoint to which the data to potentially be leaked is transferred, wherein obtaining one or more of the entity costs comprises the microprocessor:
obtaining a set of entities of the given type of entity, each of the set of entities being associated with the selected behavioral activity; obtaining a set of sub-costs, each sub-cost being associated with a member of the set of entities; and determining a weighted sum of the set of sub-costs, and wherein each sub-cost is weighted by a weighting factor equal to $2^{-i}$, to where i corresponds to the ordinal position of the respective sub-cost relative to other sub-costs in the set of sub-costs when the set of sub-costs is sorted in order of descending value.

9. The method of claim 1, further comprising:
initializing, by the microprocessor, a risk score of the one or more digital data files based on a rule set, the rule set defining the risk score as a function of one or more of: file type, location, author, owner or user, keywords, filename pattern, metadata contained in the one or more digital data files, and a combination thereof;
adjusting, by the microprocessor, the risk scores in response to ongoing interaction with the data files;
identifying, by the microprocessor, one or more commonalities across the one or more digital data files; and
propagating, by the microprocessor, an adjusted risk score between digital data files based on said identified commonalities.

10. The method of claim 9, wherein a commonality is identified based on one or more of: data from a first digital data file being copied to a second digital data file, when a compressed or encoded version of a digital data file is made, when digital data files have a common owner, user, keyword, location, and/or metadata, a clustering operation, and combinations thereof.

11. The method of claim 1, further comprising:
initializing, by the microprocessor, a risk score of one or more persons based on a rule set, the rule set defining the risk score as a function of one or more of: a position of the one or more persons within an organization, an affiliation of the one or more persons with another organization, a history of the one or more persons with a data breach offense, a privileged access of the one or more persons to sensitive information, and combinations thereof;

adjusting, by the microprocessor, the risk score in response to ongoing monitoring of events associated with activities of the one or more persons;

identifying, by the microprocessor, a commonality between the one or more persons and other one or more persons, and propagating, by the microprocessor, an adjusted risk score between digital data files based on said identified commonalities.

12. The method of claim 11, wherein the adjustments are made based on one or more of: operator input, an event adding one or more users to a watch list, an event associated with the one or more persons' actions, and combinations thereof, and wherein a commonality is identified based on one or more of: two persons working together on a project, two persons interacting and sharing digital data files, a clustering operation, and combinations thereof.

13. A computer program product comprising a non-transitory computer readable memory storing computer executable instructions thereon that cause a processor to perform a method, the instructions comprising:

instructions to receive reports derived from monitoring ongoing interaction with a digital data file, the interaction comprising a selected behavioral activity;

instructions to determine a first risk component measuring a risk of data loss or data leakage associated with one or more of a person and computing machine involved in performing the selected behavioral activity;

instructions to determine a second risk component associated with sensitivity of data contained in t h e digital data file accessed in the selected behavioral activity, the second risk component being a measure of sensitivity of the digital data file accessed by the selected behavioral activity;

instructions to determine a third risk component measuring a risk of data loss or data leakage associated with an endpoint which is to receive the data contained in the accessed digital data file due to the selected behavioral activity;

instructions to determine a fourth risk component associated with a type of the selected behavioral activity, the fourth risk component being a measure of a degree of deviation of the selected behavioral activity from a normal, baseline behavior;

instructions to measure an aggregate risk associated with the selected behavioral activity as a function of the first risk component, the second risk component, the third risk component, and the fourth risk component;

instructions, in response to the measured aggregate risk associated with the selected behavioral activity, to act to mitigate the measured aggregate risk associated with the selected behavioral activity; and wherein the measured aggregate risk associated with the selected behavioral activity provides an indication of probability of data loss or leakage and/or consequences of data loss or data leakage from the digital data file as a result of the selected behavioral activity.

14. The computer program product of claim 13, wherein the selected behavioral activity corresponds to a plurality of potential undesired events and wherein the instructions further comprise for each of a plurality of the first, second, third and fourth risk components:

instructions to obtain one or more probabilities, each probability of the one or more probabilities being a conditional probability associated with a selected potential undesired event of the plurality of potential undesired events;

instructions to adjust each of the one or more probabilities by multiplication with a respective probability weighting factor indicating a severity of the corresponding selected potential undesired event relative to others of the plurality of potential undesired events;

for each potential undesired event of the plurality of potential undesired events, instructions to obtain one or more entity costs, each entity cost being representative of a contribution to a risk associated with a given type of entity associated with the selected behavioral activity;

for each potential undesired event of the plurality of potential undesired events, instructions to determine a corresponding resultant cost as a function of the entity costs; and instructions to measure the risk as an expectation over the corresponding resultant costs distributed over the associated probabilities of the plurality of potential undesired events.

15. A system for measuring risk associated with a behavioral activity, the system comprising:

a microprocessor;

a non-transitory computer readable storage medium having executable instructions thereon that when executed by the microprocessor, cause the microprocessor to:

receive reports derived from monitoring an ongoing interaction with a digital data file, the interaction comprising a selected behavioral activity;

determine a first risk component measuring a risk of data loss or data leakage associated with one or more of a person and a computing machine involved in performing the selected behavioral activity;

determine a second risk component associated with a sensitivity of data contained in the digital data file accessed in the selected behavioral activity, the second risk component being a measure of sensitivity of the one or more digital data files accessed by the selected behavioral activity;

determine a third risk component measuring a risk of data loss or data leakage associated with an endpoint which is to receive the data contained in the accessed digital data file due to the selected behavioral activity;

determine a fourth risk component associated with a type of the selected behavioral activity, the fourth risk component being a measure of a degree of deviation of the selected behavioral activity from a normal, baseline behavior;

measure an aggregate risk associated with the selected behavioral activity as a function of the first risk component, the second risk component, the third risk component, and the fourth risk component;

in response to the measured aggregate risk associated with the selected behavioral activity, act to mitigate the measured aggregate risk associated with the selected behavioral activity; and wherein the measured aggregate risk associated with the selected behavioral activity provides an indication of probability of data loss or leakage and/or consequences of data loss or data leakage from the digital data file as a result of the selected behavioral activity.

16. The system of claim 15, wherein the first, second, third and/or fourth risk components each correspond to a probability that an event of negative impact may occur multiplied by a respective cost associated with the event of negative impact, wherein the respective cost is a function of a corresponding system-defined entity sub-cost and a corresponding user-defined entity sub-cost and wherein the acting comprises the microprocessor one or more of: alerting an operator of a potential data leak, disconnecting a computing machine, recalling a message, taking a portion of a communication network offline, temporarily restricting or revoking privileges of a person, and combinations thereof.

17. The system of claim 15, wherein one or more of the first, second, third and fourth risk components is/are a function of a first probability distribution that the selected behavioral activity is acceptable and a second probability distribution that the selected behavioral activity is not acceptable.

18. The system of claim 15, wherein each of the first, second, third and/or fourth risk components each correspond to a probability that an event of negative impact may occur multiplied by a respective cost associated with the event of negative impact and wherein the respective cost is determined by the following function:

$$C(X) = \Sigma_{i \in I(X)} 2^{-i} R_{x[i]}$$

wherein X represents a set of entities under consideration, I(X) is a set of natural numbers from 1 to $\|X\|$, $R_x$ represents an entity sub-cost corresponding to each entity x selected from the set X, and x[i] represents the entity x having $i^{th}$ largest value $R_x$, wherein, $R_{x[i]}$ represents the $i^{th}$ largest sub-cost over all elements in the set X and the set X can be replaced with P, A or E to denote the appropriate type of entity, and wherein the sets P, A and E refer to sets of persons, assets and endpoints under consideration.

19. The system of claim 15, wherein the microprocessor:
initializes a risk score of the digital data file based on a rule set, the rule set defining the risk score as a function of one or more of: file type, location, author, owner or user, keywords, filename pattern, metadata contained in the digital data file, and a combination thereof;
adjusts the risk scores in response to ongoing interaction with the data file;
identifies one or more commonalities across one or more digital data files; and
propagates an adjusted risk score between the one or more digital data files based on said identified commonalities.

20. The system of claim 15, wherein the microprocessor:
initializes a risk score of one or more persons based on a rule set, the rule set defining the risk score as a function of one or more of: a position of the one or more persons within an organization, an affiliation of the one or more persons with another organization, a history of the one or more persons with a data breach offense, a privileged access of the one or more persons to sensitive information, and combinations thereof;
adjusts the risk score in response to ongoing monitoring of events associated with activities of the one or more persons;
identifies a commonality between the one or more persons and other one or more persons, and
propagates an adjusted risk score between digital data files based on the identified commonalities.

* * * * *